United States Patent
Chen et al.

(10) Patent No.: US 6,723,230 B1
(45) Date of Patent: *Apr. 20, 2004

(54) REGENERATION OF IRON-BASED HYDROGEN SULFIDE SORBENTS

(75) Inventors: Jingguang G. Chen, Hockessin, DE (US); Leo D. Brown, Baton Rouge, LA (US); William C. Baird, Jr., Baton Rouge, LA (US); Gary B. McVicker, Califon, NJ (US); Edward S. Ellis, Fairfax, VA (US); Michele S. Touvelle, Baton Rouge, LA (US); Darryl P. Klein, Ellicott City, MD (US); David E. W. Vaughan, Flemington, NJ (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/620,796

(22) Filed: Jul. 21, 2000

Related U.S. Application Data

(63) Continuation-in-part of application No. 09/326,827, filed on Jun. 7, 1999, now Pat. No. 6,221,240, which is a continuation-in-part of application No. 08/918,641, filed on Aug. 22, 1997, now Pat. No. 5,935,420.
(60) Provisional application No. 60/024,737, filed on Aug. 23, 1996.

(51) Int. Cl.$^7$ .................. C10G 25/00; C10G 25/12; C10G 45/60
(52) U.S. Cl. ............. 208/213; 208/211; 208/212; 208/217; 208/226; 208/299; 502/20; 502/34; 502/53
(58) Field of Search ............... 208/213, 211, 208/212, 217, 226, 299; 502/20, 34, 53

(56) References Cited

U.S. PATENT DOCUMENTS

| | | | |
|---|---|---|---|
| 3,539,306 A | | 11/1970 | Kumura et al. ............... 23/315 |
| 3,796,792 A | | 3/1974 | Miyata et al. ............... 423/250 |
| 3,879,523 A | | 4/1975 | Mitata et al. ............... 423/250 |
| 4,263,020 A | | 4/1981 | Eberly ............... 55/62 |
| 4,442,078 A | * | 4/1984 | Jalan et al. ............... 423/230 |
| 4,454,244 A | | 6/1984 | Woltermann ............... 502/208 |
| 4,690,806 A | | 9/1987 | Schorfheide ............... 423/230 |
| 4,729,889 A | * | 3/1988 | Flytani-Stephanopoulos et al. |
| 4,831,206 A | * | 5/1989 | Zarchy ............... 585/737 |
| 4,831,207 A | | 5/1989 | O'Keefe et al. ............ 585/737 |
| 5,057,296 A | | 10/1991 | Beck ............... 423/277 |
| 5,185,135 A | | 2/1993 | Pillai et al. ............... 423/320 |
| 5,283,047 A | | 2/1994 | Vaughan et al. ............ 423/713 |
| 5,366,614 A | | 11/1994 | Russ et al. ............... 208/65 |
| 5,427,752 A | * | 6/1995 | Suehiro et al. |
| 5,439,583 A | | 8/1995 | Robinson et al. ............. 208/62 |
| 5,518,607 A | * | 5/1996 | Field et al. ............... 208/212 |
| 5,891,323 A | * | 4/1999 | Willis ............... 208/211 |

OTHER PUBLICATIONS

Hydrodesulfurization of Methyl–Substituted Dibenzothophenes Catalyzed by Sulfided Co–Mo / y–A1203, M. Houalla et al., Journal of Catalysis, 61, (1980), 523–527.

Reactives, Reaction Networks, and Kinetics in High Pressure Catalytic Hydroprocessing, Girgis and Gates, Ind, Eng. Chem, 30, (1991), 2021–2058.

Hydrotalcite–Type Anionic clays: Preparation, Properties and Applications, Cavani et al., Catalysis Today, vol. 11, No. 2. (1991), 173–301.

A Review of Deep Hydrosulfurization Catalysis, Vasudevan et al., Catalysis Reviews—Sci. Eng., 38, (2) (1996), 161–188.

Deep hydrosulfurization of diesel fuel: Design of reaction process and catalysis, Mochida et al., Catalysis Today 29(1996), 185–189.

Effect of experimental parameters on the relative reactivity of dibenzothiophene and 4–methyldibenzothiophene, Lamure–Meille et al., Applied Catalysis A: General 131 (1995), 143–157.

* cited by examiner

Primary Examiner—Walter D. Griffin
Assistant Examiner—Tam M. Nguyen
(74) Attorney, Agent, or Firm—Gerard J. Hughes

(57) ABSTRACT

A process to regenerate iron-based hydrogen sulfide sorbents using steam. The steam is preferably mixed with hydrogen-containing gas and/or an inert gas, such as nitrogen. In a preferred embodiment, the sorbent is first exposed to the steam and then exposed to a hydrogen-containing gas at regeneration conditions.

31 Claims, No Drawings

REGENERATION OF IRON-BASED HYDROGEN SULFIDE SORBENTS

CROSS REFERENCE TO RELATED APPLICATIONS

The present application is a continuation-in-part of U.S. Ser. No. 09/326,827, filed Jun. 7, 1999, now U.S. Pat. No. 6,221,240, which is a continuation-in-part of U.S. Ser. No. 08/918,641, filed Aug. 22, 1997, issued Aug. 10, 1999 as U.S. Pat. No. 5,935,420, which claims the benefit of Provisional Application Serial No. 60/024,737 filed Aug. 23, 1996.

FIELD OF THE INVENTION

The present invention relates to a process for regenerating iron-based hydrogen sulfide sorbents comprising treating a spent iron-based hydrogen sulfide sorbent with steam. In a preferred embodiment, the iron-based sorbent is first contacted with steam, preferably mixed with at least one of a hydrogen gas and an inert gas, such as nitrogen, followed by contacting with hydrogen under regeneration conditions.

BACKGROUND OF THE INVENTION

The removal of sulfur from feedstocks is a fundamental process of the refining and petrochemical industries. One process for removing sulfur from a feedstock is hydrodesulfurization. Hydrodesulfurization involves the reaction of sulfur in the feedstock with hydrogen over supported noble metals, such as Pt, Pd, or supported non-noble metal catalysts, especially Co/Mo and Ni/Mo catalysts, at fairly severe temperatures and pressures thereby forming hydrogen sulfide.

The performance of the hydrodesulfurization catalysts, especially those containing a noble metal, can be inhibited by the presence of hydrogen sulfide. The use of sorbents to remove hydrogen sulfide produced during desulfurization improves the effectiveness of the overall hydrodesulfurization process.

The performance of a hydrogen sulfide sorbent depends on a variety of properties. Thermodynamics and kinetics of sulfidation clearly are important, because they determine the overall sulfur capacity before breakthrough at some predetermined level of hydrogen sulfide. Other important sorbent properties include stability and regenerability in extended use, the operating conditions required for regeneration, and the composition of the regeneration off-gas, which largely determines the choice of a downstream sulfur recovery process. A practical limitation on the use of any hydrogen sulfide sorbent is the ability to regenerate the sorbent. Zinc oxide, one of the most promising and widely studied sorbents, has a very high equilibrium constant for sulfidation, but it is difficult to regenerate. The use of zinc oxide may, therefore, be limited by economic constraints relating to the level of sulfur being processed, the reactor volumetrics required, and issues pertaining to removal and disposal of the spent sorbent. These limitations are relieved if the sorbent is capable of multicycle operation made possible by a means for regenerating the sorbent.

Regenerable solid sorbents currently used for treating hot gaseous streams are typically based on metal oxides and are regenerated under oxidizing conditions at temperatures frequently greater than about 600° C. The regeneration of these sorbents using an oxidizing atmosphere requires an initial displacement of combustible organics, which not only is costly, but can also be hazardous.

Regeneration using hydrogen gas has been proposed as an alternative to oxidizing conditions for sorbents containing one or more of iron, cobalt, nickel, and/or copper. The use of hydrogen gas is effective for cobalt, nickel, and copper containing sorbents, but it is difficult to achieve substantially complete regeneration of an iron-containing sorbent using hydrogen alone. Therefore, methods are needed for the substantially complete regeneration of iron-containing sorbents using a non-oxidizing atmosphere.

SUMMARY OF THE INVENTION

The present invention provides a process for regenerating a spent iron-based hydrogen sulfide sorbent, comprising: exposing the spent iron-based hydrogen sulfide sorbent to a sufficient concentration of steam under conditions effective for the steam to regenerate the spent iron-based hydrogen sulfide sorbent.

In a preferred embodiment the spent iron-based sorbent is treated with steam in a first step, followed by being treated with hydrogen in a second step.

In another preferred embodiment of the present invention a mixture of steam and hydrogen are used in the first treatment step.

In still another preferred embodiment of the present invention a mixture of steam and hydrogen and an inert gas are used in the first treatment step.

DETAILED DESCRIPTION OF THE INVENTION

The present invention uses steam, preferably in combination with at least one of hydrogen and an inert gas, to regenerate an iron-based spent hydrogen sulfide sorbent. In a more preferred embodiment, the spent iron-based sorbent is contacted with a mixture of steam and at least one of hydrogen and nitrogen gas in a first treatment step, followed by being treated with hydrogen in a second treatment step, both steps being conducted under sorbent regeneration conditions.

It is within the scope of this invention that the iron-based sorbents be either bulk iron materials, or iron on a suitable support, such as an inorganic oxide. Non-limiting examples of suitable iron-based supported regenerable sorbents include, but are not necessarily limited to: 5 $Fe/Al_2O_3$, 10 $Fe/SiO_2$, and 20 $Fe/ZrO_2$, wherein the numbers 5, 10, and 20 refer to the wt. % Fe based on the total weight of the sorbent. As previously mentioned, the hydrogen sulfide sorbent may be employed as a metal oxide or as bulk iron. If bulk iron is used as the sorbent in may be used as one or more type of finely divided skeleton metal, including Raney metals, ponderous metals, Rieke metals, and metal sponges.

If a support material is used, it is preferably one that will increase at least one of the surface area, pore volume, and pore diameter of the overall sorbent. Suitable support materials include, but are not limited to alumina, silica, zirconia, carbon, silicon carbide, kieselguhr, amorphous and crystalline silica-aluminas, silica-magnesias, aluminophosphates, boria, titania, and combinations thereof. Preferred support materials include alumina, silica, and zirconia. The iron or iron oxide may be loaded onto these support materials by conventional techniques known in the art. Such techniques include impregnation by incipient wetness, adsorption from an excess impregnating medium, and ion exchange. In a preferred embodiment, the regenerable sorbents are prepared by conventional impregnation techniques using aqueous solutions of iron halides, oxides, hydroxides, carbonates, nitrates, nitrites, sulfates, sulfites, carboxylates and the like. The iron or iron oxide loadings may vary with the quantity of sulfur to be adsorbed per cycle, the cycle frequency, and the regeneration process conditions and hardware. Iron loadings will range from about 2 wt. % to about 80 wt. %, preferably from about 3 wt. % to about 60 wt. %, and more preferably from about 5 wt. % to about 50 wt. %, based on the total weight of the regenerable sorbent. After impregnation onto a support, the sorbent typically is dried, calcined, and reduced; the latter may either be conducted ex situ or in situ, as preferred. The regenerable sorbent may comprise iron only, or iron with one or more additional metals.

In addition to its activity as a hydrogen sulfide sorbent, Fe is also a hydrocracking metal. Unless its hydrocracking activity is suppressed, Fe may cause hydrocracking of the other hydrocarbon stream being treated, leading to the production of low value light gas. The hydrocracking activity of the sorbent metal can be suppressed by incorporating from about 1 wt. % to about 10 wt. %, preferably from about 1.5 wt. % to about 7 wt. %, and most preferably from about 2 wt. % to about 6 wt. %, of a metal selected from Group IB or Group IVA of the Periodic Table of the Elements, such as Cu, Ag, Au, Sn, or Pb, preferably Cu.

Hydrogenolysis also can be suppressed by incorporating a small amount, preferably from about 0.01 wt. % to about 1 wt. %, of one or more of the elements selected from Group VIA of the Periodic Table of the Elements. The Periodic Table of the Elements referred to herein appears on the inside cover of the Merck Index, Twelfth Edition, Merck & Co., 1996.

Accordingly, the sorbent may be presulfided conventionally, for example, by exposing the virgin sorbent to dilute hydrogen sulfide in hydrogen at a temperature from about 200° C. to about 400° C. for about 15 minutes to about 15 hours, or until sulfur breakthrough is detected. Sulfur levels of the presulfided sorbent will range from about 0.01 to about 1.0 wt. %, preferably from about 0.02 to about 0.7 wt. %, most preferably from about 0.02 to about 0.5 wt. %. Alternately, the iron-based sorbent can be pre-sulfided by exposing the sorbent, preferably in its virgin, or fresh, form to a dilute aqueous solution of from about 1 vol. % to about 10 vol. % sulfuric acid under impregnation conditions.

Regeneration of the sorbent using a reducing environment generally requires more severe temperatures than those employed during the hydrodesulfurization (HDS) reaction. Typical regeneration temperatures are from about 100° C. to about 700° C., preferably from about 250° C. to about 600° C., and more preferably from about 275° C. to about 550° C. A most preferred regeneration temperature range is from about 500° C. to about 550° C. The regeneration process is operable over a range of temperatures and pressures consistent with the intended objectives in terms of product quality improvement and consistent with any downstream process with which this invention is combined in either a common or sequential reactor assembly. Operating pressures may range from about 0 to about 3000 psia, preferably from about 50 to about 1000 psia, at $H_2$ gas rates of from about 10 to about 2,000 SCF/hr/lb. of sorbent (standard cubic feet per hour per pound), preferably about 100 to about 1,000 SCF/hr/lb of sorbent.

Hydrogen is a preferred component of the regeneration process of the present invention. Hydrogen may be supplied from a hydrogen-containing stream of pure hydrogen or inert gases, preferably nitrogen. It is preferred that the hydrogen-containing stream be substantially free of sulfur, which can be achieved by conventional technologies known in the art. The hydrogen-containing stream will contain from about 50 vol. % to about 100 vol. % hydrogen, preferably from about 70 vol. % to about 100 vol. % hydrogen, and more preferably from about 80 vol. % to about 100 vol. % hydrogen, with any remainder being an inert gas or saturated light hydrocarbon gases.

When hydrogen gas only is employed as the regeneration medium, the iron may be incompletely regenerated. However, substantially complete regeneration of an iron-based sorbent material, such as $Fe/ZrO_2$, may be achieved for at least several cycles by using a combination of steam and hydrogen. While regeneration may be performed under conventional conditions, a preferred process for regenerating a spent iron-based sorbent in accordance with the present invention is to heat the spent iron-based sorbent from about 400° C. to about 600° C., preferably to about 500° C., in a mixture comprising from about 5 vol. % to about 95 vol. % steam, preferably from about 10 vol. % to about 80 vol. % steam, more preferably from about 15 vol. % to about 60 vol. % steam, most preferably from about 20 vol. % to about 50 vol. % steam. In another preferred embodiment, a mixture comprising about 20 vol. % steam combined with hydrogen and optionally one or more inert or light hydrocarbon gases is heated to about 500° C. for about 0.25 hour to about 10 hour, preferably for about 1.5 hour. Thereafter, the iron-based sorbent is exposed to hydrogen at regeneration conditions for about 30 minutes.

Among the properties desired in a regenerable hydrogen sulfide sorbent are capacity to absorb hydrogen sulfide, regenerability, and the retention of both qualities over multicycle adsorption-regeneration sequences. Although it is preferred that both capacity and regenerability for a given sorbent approach about 100%, it should be understood that this level is not a requirement for a commercially effective regenerable hydrogen sulfide sorbent. A capacity and regenerability that allow a frequency of regeneration that is reasonable and compatible with the overall process objective are acceptable and adequate. With this qualification in mind, an "effective regenerated capacity" is from about 5% to about 100%, by weight, of a first cycle capacity, preferably from about 10% to about 100% of a first cycle capacity, most preferably from about 20% to about 100% of a first cycle capacity. A "first cycle capacity" refers to the sorbent capacity of a fresh or "virgin" sorbent material.

In a preferred embodiment, the iron-based sorbent is used in distillate and naphtha hydrodesulfurization (HDS) processes to sorb hydrogen sulfide as it is generated. Typical hydrodesulfurization processes are well known in the art and are represented by the disclosures of one or more of U.S. Pat. Nos. 5,925,239, 5,928,498, and/or 5,935,420, all incorporated herein by reference.

Typical hydrodesulfurization conditions include temperatures from about 40° C. to about 500° C. (104–930° F.), preferably about 200° C. to about 450° C. (390–840° F.), and more preferably about 225° C. to about 400° C. (437–750° F.). Operating pressures include about 50 to about 3000 psig, preferably about 50 to about 1200 psig, and more preferably about 100 to about 800 psig at gas rates of about 50 to about 10,000 SCF/B, preferably about 100 to about 750 SCF/B, and more preferably about 500 to about 5000 SCF/B. The liquid hourly space velocity may be varied over the range of about 0.1 to about 100 V/V/Hr, preferably about 0.3 to about 40 V/V/Hr, and more preferably about 0.5 to about 30 V/V/Hr. The liquid hourly space velocity is based on the volume of feed per volume of catalyst per hour, i.e., V/V/Hr.

Various sorbent bed configurations may be used in the practice of the present invention. Examples of suitable bed configurations include, but are not necessarily limited to, fixed beds, non-fluidized moving beds, fluidized beds, or a slurry of HDS catalyst and sorbent in a continually stirred tank reactor ("CTSR") or slurry bubble column.

Fixed bed configurations may be operated in either of cocurrent and countercurrent modes, i.e., with hydrogen-containing treat gas flowing over the HDS catalyst in the same or opposite direction to the sulfur-containing feed. In another embodiment, the hydrogen-containing treat gas is employed in a "once-through" arrangement and is, therefore, not recycled. Countercurrent HDS arrangements may be preferred in cases where increased contacting between the sulfur-containing feed, treat gas, and catalyst would be desired and in cases where $H_2S$ stripping would be beneficial. Fluidized beds may be advantageous in conjunction with processes where continuous regeneration of the sorbent is needed. In addition, flow-through, fluidized bed technology that includes a disengaging zone for catalyst and sorbent may be useful to regenerate sorbent particles.

Those skilled in the art are aware that the choice of bed configuration for an HDS catalyst and a sorbent depends upon the objective of the overall process, particularly when the process is integrated with one or more subsequent processes, or when the objective of the overall process is to favor the selectivity of one aspect of product quality relative to another. However, it should be noted that it is preferred that the sorbent not be placed upstream of the HDS catalyst.

A preferred embodiment uses a stacked bed configuration with a swing reactor designed to permit regeneration of spent sorbent while a fresh sorbent is placed in service. In a stacked bed configuration, the HDS catalyst is stacked, or layered, above and upstream of a sorbent bed. The stacked beds either may occupy a common reactor, or the HDS catalyst may occupy a separate reactor upstream of the reactor containing the sorbent. Such a dedicated reactor sequence would be useful, for example, when it is desired that the HDS catalyst and the sorbent be exposed to different reactor temperatures.

In another embodiment, the sorbent and HDS catalyst are used in a mixed bed configuration. In this configuration, particles of the HDS catalyst are intimately intermixed with those of the sorbent. In both the stacked bed and the mixed bed configurations, the HDS catalyst particles and the sorbent particles may be of similar or identical shapes and sizes. The particles of one component may also differ, for example, in shape, density, and size from the particles of the second component. The use of particles having different sizes may be employed, for example, when a simple physical separation of the bed components is desired upon discharge or reworking. It should be noted that when the sorbent and the HDS catalyst are used in combination, that undesirable desulfiding of the catalyst may result from sorbent regeneration. In such cases, it may be desirable to, for example, adjust the regeneration conditions to lessen the affects of catalyst desulfiding to provide for re-sulfiding the catalyst prior to re-use, to separate the catalyst and sorbent prior to sorbent regeneration, or some combination thereof. Resulfiding may also be accomplished when the catalyst is exposed to the sulfur-containing feed.

In yet another embodiment, the two components are blended together to form a composite particle incorporating both the HDS catalyst and the iron-based sorbent. For example, a finely divided, powdered Pt on alumina catalyst is uniformly blended with a regenerable iron-based sorbent and the mixture is formed into a common catalyst particle by conventional techniques. Or, the regenerable sorbent may also be incorporated into the support, and Pt, for example, may be impregnated onto the sorbent containing support, such as alumina.

In another two component configuration, a support, preferably an alumina support, is impregnated with a noble metal, preferably a Pt salt and iron. Both metals may be distributed uniformly throughout the resulting catalyst particle, or the iron component may be deposited preferentially on the outside of the particle to produce a rim, or eggshell, sorbent- or HDS catalyst-rich zone.

A three-component bed configuration may also be used. In one embodiment, denoted as mixed/stacked bed, a mixed bed containing the HDS catalyst and iron-based sorbent is configured upstream of a single bed of HDS catalyst. In another embodiment, known as a stacked/stacked/stacked configuration, the three components are layered from top to bottom as follows: HDS catalyst/iron-based sorbent/HDS catalyst. In one embodiment, three component systems may occupy a common reactor. In another embodiment, a three-component system may be used in a two-reactor train in which the HDS catalyst/sorbent occupy a lead reactor in a mixed or stacked configuration and a HDS catalyst occupies the tail reactor. This arrangement allows for the operation of two reactor sections at different process conditions, especially temperature, and imparts flexibility in controlling process parameters such as selectivity and product quality.

The composition of the bed is independent of configuration and may be varied in accordance with the specific or integrated process to which the invention is applied. If the capacity of the sorbent is limiting, the composition of the bed must be consistent with the expected lifetime, or cycle, of the process. These parameters are in turn sensitive to the sulfur content of the feed being processed and to the degree of desulfurization desired. For these reasons, the composition of the bed is flexible and variable, and the optimal bed composition for one application may not serve an alternative application equally well. In general, the weight ratio of the sorbent to the hydrodesulfurization catalyst may range from about 0.01 to about 1000, preferably from about 0.5 to about 40, and more preferably from about 0.7 to about 30. For three component configurations, these ranges apply to the mixed zone of the mixed/stacked arrangement and to the first two zones of the stacked/stacked/stacked design. The hydrodesulfurization catalyst present in the final zone of these two arrays is generally present at a weight ratio that is equal to or less than the combined weight compositions of the upstream zones.

The process of the present invention may be used as a stand-alone process for, for example, fuels, lubes, and chemicals applications. Alternately, the process may be combined and integrated with other processes in a manner so that the net process affords product and process advantages and improvements relative to the individual processes not combined. The following embodiments are included to illustrate, but not limit, uses for the process of this invention.

Processes relating to fuels processes include: desulfurization of gasoline range feed and product streams; desulfurization of distillate streams; desulfurization of FCC streams preceding recycle to $2^{nd}$ stage process; desulfurization of hydrocracking feeds; multi-ring aromatic conversion through selective ring opening; aromatics saturation processes; sulfur removal from natural, synthesis, and recycle gas streams and from field condensate streams. Processes relating to the manufacture of lubricants include: hydrocracking, product quality improvement through mild finishing treatment; optimization of white oil processes by decreasing catalyst investment and/or extending service factor. Processes relating to chemical processing include: substitute for environmentally unfriendly nickel based hydroprocesses; preparation of high quality feedstocks for olefin manufacture through various cracking processes and for the production of oxygenates by oxyfunctionalization processes; production of solvent and polymer grade olefins and aromatics.

This invention is illustrated by, but not limited to the following examples, in which the following experimental conditions were used unless otherwise indicated:

GENERAL CONDITIONS

The capacity and hydrogen regenerability of the iron-based sorbents of the present invention were assessed using a Cahn TG 121 Thermogravimetric Analyzer using nominally equivalent weight charges of each sorbent. The candidate sorbents were initially calcined in air at 400° C. for 3 hr prior to being placed in the analyzer. The sorbent was heated at 500° C. for 1 hr in hydrogen and then cooled to 325° C. and exposed to a gas blend containing 1000 vppm $H_2S$ in $H_2$ for a period of 2 hr during which interval the weight gain associated with the adsorption of $H_2S$ was recorded. The spent sorbent was subsequently heated to 500° C. in a 20% steam/$H_2$ mixture, or a 20% steam/$N_2$ blend for 1.5 hour and subsequently in $H_2$ for 30 min., during which interval the desorption of $H_2S$, or the regeneration of the sorbent, was noted. In multicycle testing, this sequence was duplicated as noted to simulate repetitive adsorption-regeneration cycles. Regenerability was further confirmed by the observation of phase changes using a controlled environment, high temperature cell mounted on an X-ray diffractometer.

The sorbents were prepared by incipient wetness impregnation of the various support materials with aqueous solutions of the appropriate metal nitrates. The impregnated materials were air dried under vacuum at 120° C. for 24 hr. Calcination in flowing air was carried out in a small catalyst pretreat unit or in a thermogravimetric unit dedicated to this function. In both cases the calcination was conducted at 400° C. for 3 hr. All sorbent compositions in the examples are nominal wt. % metal on support.

EXAMPLE I

This experiment compared zinc oxide (a non-hydrogen regenerable sorbent) as a control for Fe, Co, Ni, and Cu. In this experiment, the spent sorbent was regenerated by heating to 500° C. in only $H_2$ for one hour and to 550° C. for one hour. Steam was not used.

| Sample No. | Sorbent | Sulfur Gain, Wt. % | Regeneration, % |
|---|---|---|---|
| 1 | ZnO | 8.0 | 0 |
| 2 | 10 Fe/$ZrO_2$ | 5.3 | 45 |
| 3 | 10 Co/$ZrO_2$ | 4.9 | 95 |
| 4 | 10 Ni/$ZrO_2$ | 3.5 | 73 |
| 5 | 20 Ni/$ZrO_2$ | 6.1 | 79 |
| 6 | 20 Cu/$ZrO_2$ | 4.3 | 63 |
| 7 | 17 Co/$TiO_2$ | 8.9 | 28 |

% Regeneration refers to the percent of chemisorbed sulfur removed from the sorbent during regeneration. If no sulfur is released during regeneration, this value is zero. Total removal of sulfur during regeneration corresponds to 100% regeneration.

The results demonstrated that Fe, Co, Ni, and Cu were active hydrogen sulfide sorbents and were capable of being regenerated by hydrogen to varying degrees. Co and Ni were more regenerable than Fe and Cu on a common support. Metal loading (Samples 4 and 5) exerted an influence on capacity but not on regenerability. Titania (Sample 7) was least preferred as a support although the degree of regenerability was within the limits of this invention.

EXAMPLE II

A 10% Fe/$ZrO_2$ sorbent (Sample 2) was tested by the procedure described in Example I. The weight gain was 4.6 wt. % corresponding to conversion of the Fe to its sulfide. The sorbent was regenerated as described above using a 20% steam/$N_2$ blend followed by hydrogen reduction to remove substantially 100% of the absorbed sulfur. Second cycle testing of the regenerated sorbent showed sulfur capacity equivalent to that of the fresh sorbent.

What is claimed is:

1. A process for regenerating an iron-based hydrogen sulfide sorbent comprised of bulk iron or iron on a suitable support, which sorbent has an inherent capacity for absorbing hydrogen sulfide, but which sorbent contains a level of sulfur defining a spent capacity for absorbing hydrogen sulfide, which spent capacity is substantially less than said inherent capacity, said process consisting essentially of:
    treating said iron-based sorbent having said spent capacity with an effective amount of steam at reducing regeneration conditions, thereby substantially reducing the level of sulfur of said iron-based sorbent and resulting in a regenerated iron-based sorbent having a capacity for absorbing hydrogen sulfide from about 5% to about 100% of said inherent capacity.

2. The process of claim 1 wherein said sorbent is comprised of bulk iron.

3. The process of claim 1 wherein said sorbent is comprised of iron on an inorganic support material.

4. The process of claim 3 wherein the inorganic support material is $ZrO_2$.

5. The process of claim 1 wherein a gas is present with said steam, which gas is selected from the group consisting of hydrogen and inert gases.

6. The process of claim 5 wherein said inert gas is nitrogen.

7. The process of claim 5 wherein hydrogen is used in mixture with steam.

8. The process of claim 7 wherein the volume percent of steam is from about 5% to 95% based on the total volume of steam plus hydrogen.

9. The process of claim 8 wherein the volume of steam is from about 20% to 50% based on the total volume of steam plus hydrogen.

10. The process of claim 1 wherein said regeneration conditions are comprised of temperatures from about 100° C. to about 700° C. and pressures from about 0 to 3000 psia.

11. The process of claim 10 wherein said regeneration conditions are comprised of temperatures from about 250° C. to about 600° C. and pressures from about 50 to 1000 psia.

12. The process of claim 1 wherein the regenerated iron-based sorbent has a capacity for absorbing hydrogen sulfide ranging from about 5% to about 100% of the inherent capacity.

13. A desulfurization process, comprising:
    (a) contacting hydrocarbon stream containing sulfur with a catalytically effective amount of a catalyst system under catalytic hydrodesulfurization conditions, the catalyst system being comprised of:

(i) a hydrodesulfurization catalyst containing at least one of Mo, W, Fe, Co, Ni Pt, Pd, Ir, and Rh; and, (ii) a hydrogen sulfide sorbent containing bulk iron or iron on a suitable support, said hydrogen sulfide sorbent having a level of sulfur defining a first cycle capacity for absorbing hydrogen sulfide, said contacting producing a desulfurized product and a spent hydrogen sulfide sorbent; and then (b) regenerating the spent hydrogen sulfide sorbent by a process consisting essentially of contacting the spent hydrogen sulfide sorbent with a regenerating amount of steam under reducing regeneration conditions in order to form a regenerated hydrogen sulfide sorbent.

14. The process of claim 13 wherein the steam is combined with a hydrogen-containing gas.

15. The process of claim 13 wherein the regenerating conditions include a temperature ranging from about 100° C. to about 700° C. and a pressure ranging from about 0 psia to about 3000 psia.

16. The process of claim 14 wherein the steam is present in a volume ranging from about 20% to about 50%, based on the total volume of steam and hydrogen.

17. The process of claim 14 wherein the steam and hydrogen-containing gas are combined with at least one inert or light hydrocarbon diluent gas; wherein the steam is present in a volume of about 20%, based on the total volume of steam, hydrogen, and diluent; and wherein the regenerating conditions include a time ranging from about 0.25 hour to about 10 hours.

18. The process of claim 17 further comprising contacting the hydrogen sulfide sorbent with hydrogen-containing gas at a temperature rang from about 100° C. to about 700° C., at a pressure ranging from about 0 psia to about 3000 psia, for a time of about 30 minutes, following step (b).

19. The process of claim 18 wherein the hydrogen-containing gas is hydrogen.

20. The process of claim 13 wherein the sorbent further comprises at least one hydrocracking suppressor selected from Group IB, Group IVA, and Group VIA of the Periodic Table in a suppressing quantity sufficient to suppress hydrocracking.

21. The process of claim 20 wherein the hydrocracking suppressor is (i) at least one of Cu, Ag, Au, Sn, and Pb, and the suppressing quantity ranges from about 1 wt. % to about 10 wt. %, or (ii) at least one Group VIA element, and the suppressing quantity ranges from about 0.01 wt. % to about 2 wt. %.

22. The process of claim 13 wherein the hydrogen sulfide sorbent is the regenerated sorbent.

23. The process of claim 22 wherein steps (a) and (b) are performed continuously.

24. The process of claim 13 wherein at least one of the hydrodesulfurization catalyst and the hydrogen sulfide sorbent is supported on an inorganic refractory support.

25. The process of claim 13 wherein the weight ratio of the hydrogen sulfide sorbent to the hydrodesulfurization catalyst ranges from about 0.01 to about 1000.

26. The process of claim 25 wherein the hydrodesulfurization catalyst and the hydrogen sulfide sorbent are in the form of separate particles.

27. The process of claim 25 wherein the hydrodesulfurization catalyst and the hydrogen sulfide sorbent are in the form of a composited particle.

28. The process of claim 25 wherein the catalyst system is in the form of catalyst particles, and wherein the hydrogen sulfide sorbent is impregnated with the hydrodesulfurization catalyst.

29. The process of claim 13 wherein the hydrodesulfurization catalyst contains at least one of Fe, Co, Ni, Mo, and W.

30. The process of claim 13 operated in at least one of a moving bed, a bubbling bed, a non-fluidized moving bed, a fluidized bed, a continuously stirred tank reactor, and a slurry bubble column.

31. The process of claim 13 wherein the process is a fixed bed process operated in one of (i) cocurrent and (ii) countercurrent mode, and wherein the catalytic hydrodesulfurization conditions include a temperature of about 40° C. to about 500° C., a pressure ranging from about 100 psig to about 3,000 psig, a treat gas rate ranging from about 50 to about 10,000 SCF/B, and a space velocity ranging from about 0.1 to about 100 V/V/Hr.

* * * * *